March 31, 1959 M. FLECK 2,879,544
DEVICE FOR THE MANUFACTURE OF PENCILS
Filed Sept. 19, 1955 3 Sheets-Sheet 1
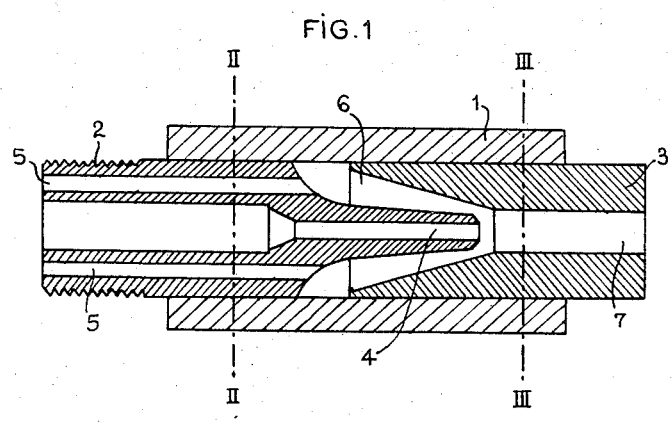
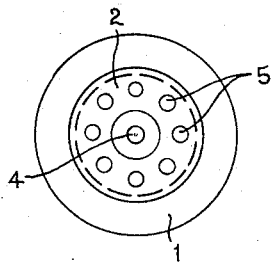 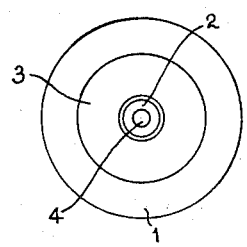

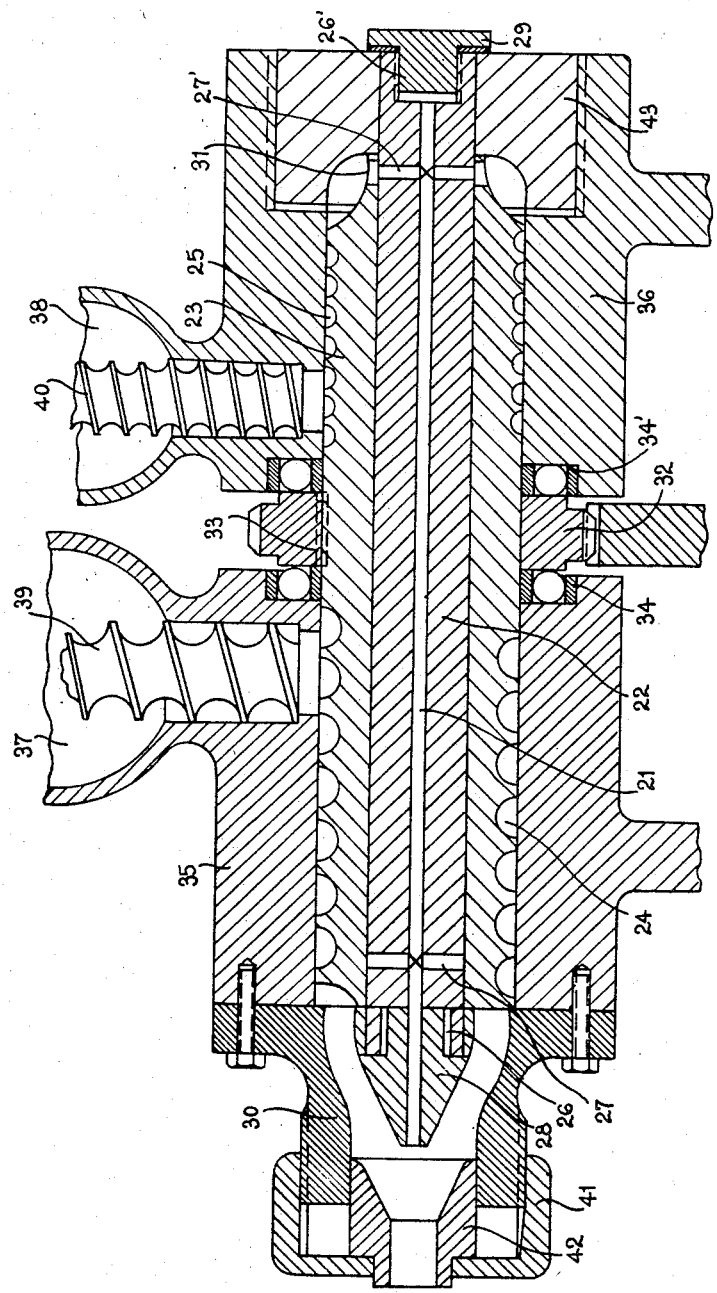

United States Patent Office 2,879,544
Patented Mar. 31, 1959

2,879,544

DEVICE FOR THE MANUFACTURE OF PENCILS

Marian Fleck, Rheinfelden, Switzerland, assignor to Society Conte, Paris, France, a body corporate of the French Republic Application September 19, 1955, Serial No. 535,222

Claims priority, application Austria April 5, 1955

1 Claim. (Cl. 18—13)

The present invention relates to a device for the manufacture of pencils by drawing or extruding a plastic composition consisting of wood flour with the addition of a binder, enclosing a lead either manufactured in advance or preferably extruded in one and the same operation as the casing which encloses it.

In the manufacture of pencils comprising casings or sheaths consisting of a plastic composition, the composition is generally extruded at the same time as the lead through suitably arranged nozzles and the rough-finished pencil is then dried and hardened, for example by heat. Such a composition has to satisfy certain conditions: it must be easy to extrude and must be capable of hardening quickly enough to form a homogeneous mass adhering firmly to the lead; it also must have an appearance and properties resembling as closely as possible, particularly with respect to hardness, those of the best natural woods used in the manufacture of pencil sheaths, for example cedar wood.

If an undressed lead is used or an undressed composition is used for extruding the leads, it is also important in the manufacture of pencils that the composition forming the sheath should have sufficient permeability for the lead of the rough extruded pencil to be impregnated with suitable oils or with melted waxes, without the impregnants tending to dissolve or soften the composition forming the sheath.

All the conditions enumerated above are satisfied in accordance with the present invention wherein the composition intended to form the sheath is subjected to a uniform pressure to bring it to a cross-section substantially equal to its final section, forcing it thereafter around the composition forming the lead, and extruding it therewith in the form of a single shaft. After extrusion, the single shaft is submitted to the action of formaldehyde in the wet or vapor form.

A preferred mode of carrying out the above process comprises the steps of subjecting the composition intended to form the sheath to a uniform pressure to bring it to a cross-section substantially equal to its final section, forcing it thereafter around the composition forming the lead, extruding simultaneously the sheath and the lead while maintaining therebetween a uniform radial spacing and applying, thereafter, progressively, the sheath onto the lead.

As a result of this method of operation, feed pressures are obtained which are uniformly distributed over the entire cross-sectional area of the nozzle apertures so as to avoid eccentricity of the lead or fragility of the sheath caused by a non-uniform density of the material. The sheath composition encloses in a perfectly regular manner the composition forming the lead and is firmly associated therewith under the action of the applied pressure, producing a compact article, so that any subsequent loosening of the lead, i. e. sliding thereof in use in relation to the sheath, is reliably eliminated.

This process also has the advantage of rendering unnecessary any preliminary moulding of the material forming the lead, and permits rough pencils to be obtained in a single operation. The crude article can then be treated in the usual manner by drying, cutting into lengths, sandpapering, varnishing, etc. The process permits the use of all the usual compositions for the manufacture of leads, particularly for graphite pencils, colored pencils and indelible pencils.

It has been suggested that pencils of the character indicated should be made by extruding the material serving to make the sheath through an extrusion die concentric with a tube for guiding a prefabricated lead or a plastic composition intended to form the lead. In the known devices for the manufacture of such pencils, the lead, or the tube receiving the plastic composition intended to form the lead, ends inside the inner chamber of the nozzle intended to form the casing, in such a manner that the plastic composition under pressure intended to form the sheath encloses and carries along with it the lead or the composition intended to form the same. It follows that the plastic composition forming the sheath is brought into contact with the lead at a moment when this composition has not yet obtained its final section. This necessarily causes a deformation of the composition forming the lead, the section of the lead being reduced and its position in the sheath being moved out of center as a result of the differences in pressure to which the two compositions are subjected at their junction in the nozzle. It is known that pencils having an eccentric lead, and an irregular cross-section, and a sheath of variable thickness are unsaleable, which is why pencils heretofore manufactured by extruding plastic compositions have not been introduced into commerce.

The invention concerns a device adapted particularly for the manufacture of pencils according to the process described above.

Generally speaking, the device according to the invention is characterized by a first extrusion die having an outlet passage the cross-section of which is equal to that of the pencil to be manufactured, a second extrusion die coaxially disposed with respect to the first die and having its outlet opening disposed substantially at the entrance side of said outlet passage, the said second die being provided with a central bore adapted for the extrusion of a mass forming a lead and with peripherally arranged axial bore adapted for the extrusion of a mass forming the sheath on said lead.

By way of example there are described below and illustrated in the annexed drawing different devices for the manufacture of pencils by simultanous extrusion of the lead and the sheath in one and the same operation.

Fig. 1 is an axial section of a double extrusion die for the simultaneous extrusion of the lead and the sheath;

Fig. 2 is a cross-section through the die of Fig. 1 along the line II—II of Fig. 1;

Fig. 3 is a similar section along the line III—III of Fig. 1;

Fig. 7 is an axial section of the entire machine intended for the manufacture of pencils by extrusion and comprising a double extrusion die fed by a press.

Figure 4:
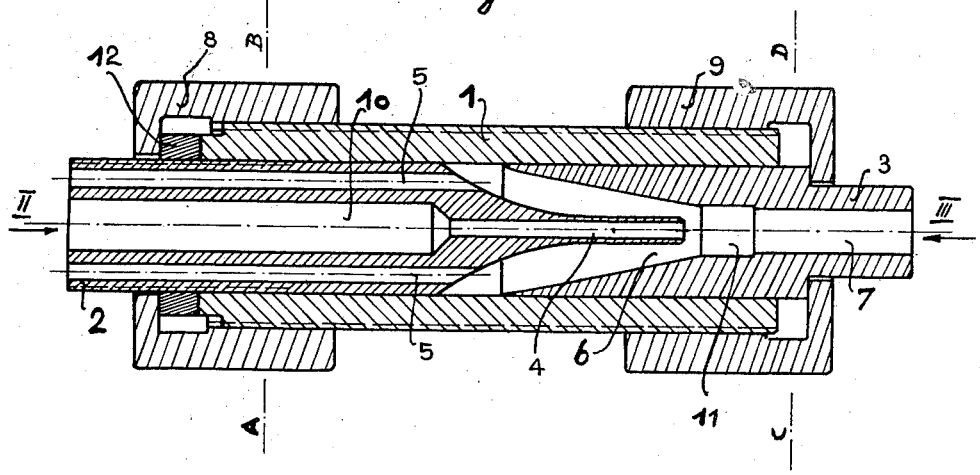
Fig. 4 is another embodiment of the device of the invention.

As shown in Figures 1 to 3, the device for the simultaneous extrusion of the lead and the casing consists of a sleeve casing 1 in which is inserted a nozzle 2 and a funnel or die 3. The nozzle 2 comprises an axial bore 4 intended for the passage of the composition forming the lead, and bores 5 arranged in a circle concentric with the bore 4 and intended for the passage of the composition on a wood fibre base. The outlets of the bores 5 lead into the cone 6 of the funnel 3 to which is connected the outlet passage 7 the cross-sectional area of which is greater than the central bore 4. As shown in Figure 1, the free end of the central bore 4 supplying the composition forming the lead, and the tapered end of the cone 6 supplying the casing material are both located substantially in front of the outlet passage 7, so that the composition forming the sheath is brought into contact with the composition forming the lead after having been compressed by a uniform pressure to a cross-section approximately equal to the finished section.

When the pasty composition forming the lead is forced through the bore 4 at the same time as the fibrous composition is forced through the bores 5, these two compositions pass together through the outlet passage of the die 3, the composition forming the lead constituting the core of the fibrous composition which envelops it completely. The extruded length thus obtained is dried, sand papered and painted and it can then be cut to form pencils of any suitable length.

Figure 5:
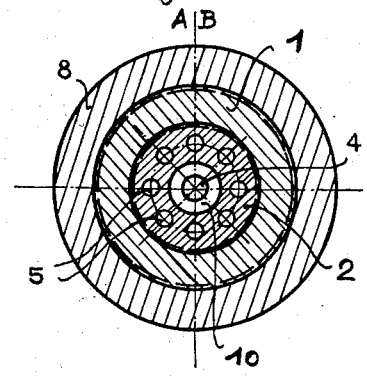
Fig. 5 is a cross-section through the die of Fig. 4, along the line A—B of Fig. 4.
Figure 6:
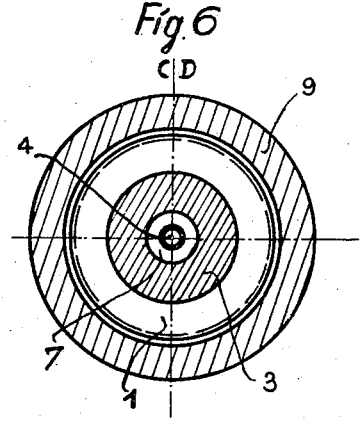
Fig. 6 is a similar section along the line C—D of Fig. 4.

According to the improved embodiment of the device illustrated in Figures 4 to 6, the relative positions of the dies 2 and 3 can be adjusted accurately in the axial direction; for this purpose, the outer sleeve 1 is provided with a thread on which are engaged box-nuts 8, 9 enabling the dies to be locked in the set position. For this purpose, the nut 8 bears against a threaded ring 12 in which is engaged the nozzle 2, while the nut 9 rests against a shoulder of the die 3. As in the preceding case, the nozzle 2 comprises a central bore 10 which receives the composition intended to form the lead, said bore being continued by an extrusion passage 4 of narrower diameter. As before, the composition forming the sheath of the pencil is forced through bores 5 arranged regularly in a circle concentric with the bore 10. At the end of the conical funnel 6 the die 3 has a cylindrical pressure chamber 11 wherein the composition which is guided along the elongated end of the nozzle 2, forms a tube receiving the composition forming the lead which is expelled through the passage 4 of the nozzle 2. After passing through the chamber 11, the outlet passage of the die 3 narrows at 7 to the final diameter, the tube constituted by the fibrous composition being uniformly applied against the central lead and leaving the die 3 in the form of a continuous extruded length forming the rough pencil.

The plastic composition and the composition intended to form the leads, are forced through the nozzle 2 by any suitable press, if necessary provided with heating means permitting the hot extrusion to be effected which is necessary for certain qualities of pencil.

Figure 7 illustrates a particularly advantageous embodiment of the press serving to feed the double nozzle according to the invention.

This press comprises a body 23 on which are provided two feed worms 24 and 25 having a right-hand and a left-hand thread respectively, the body 23 being capable of axial displacement on a fixed central core 22 which supports it and which is provided with an axial bore 21. The cylindrical supporting core 22 has threaded ends 26, 26' and radial bores 27, 27' provided in the vicinity of the threaded ends and leading into the axial bore 21. The thread 26 serves to receive a nozzle 28 for the extrusion of the lead, while the thread 26' receives a threaded stopper 29 or a pressure-gauge, if the lead is extruded at the same time as the casing, and a feed hopper if pencils are being manufactured using prefabricated leads, which feed hopper may likewise be used if a prefabricated lead has to be reinforced by the addition of a plastic composition. The set of radial bores 27' ensure the delivery to the bore 21 of the pasty composition forming the lead, while the second set of radial bores 27 ensure the lubrication of the internal rolling surface of the body 23 and of the feed worm. Because of its symmetrical construction, the supporting core 22 can be reversed.

At its end adjacent the extrusion mouth 30, the body 23 of the worm press ends in a section of a diameter equal to that of the feed worm while the body 23, on the other hand, has at its other end a narrow portion on which are provided apertures 31 through which the extruded material passes into the radial bores 27'. In the center of the body 23 of the press, between the two worms 24 and 25, is provided a driving member. The driving member 32, for example a pinion, a worm wheel or a pulley, may be mounted on the press body 23 and fixed for rotation therewith by means of a key 33. The driving member 32 is held against axial displacement by the ball bearings 34, 34' the inner rings of which are likewise mounted on the press body 23 and each of which supports one half 35, 36 of the press casing. Each of the portions 35, 36 of the casing comprises a supply tube 37, 38, corresponding to the worms 24, 25, each of said tubes being provided with an individual feed device, for example, a worm 39, 40 or a feed piston.

At the front end of the portion 35 of the casing is fixed the extrusion mouth 30 to which is screwed a box-nut 41 permitting regulation of the spacing between the nozzle 28 intended for the formation of the lead, and the nozzle 42 is guided in the mouth 30 and has applied to it the nut 41. The second portion 36 of the casing is blocked by a threaded stopper 43 in which is centered the supporting core 22 and against which abuts the end of the body 23 of the press. The other end of the body 23 of the press bears against the flange of the extrusion mouthpiece 30. The core 22 is prevented from axial displacement by the nozzle 26 and by the stopper 29 or by the part of the press which is screwed into the threaded portion 26'.

The nozzles 28 and 42 of the extrusion mouth 30 can be changed and can thereby be adapted to any desired shape of pencil. The supporting core 22, of which the bores 21, 27, 27' have to be adapted to the diameter of the lead, can likewise be changed. Finally, the body 23 of the press can likewise be replaced by another in which the worms 24, 25 have a different cross-sectional passage. By making the body 23 of the press in two parts which can be assembled together approximately in the central plane of the driving member 32, for example by means of dogs, it is possible to reduce the number of spare feed worms. Apart from these devices intended to regulate the dimensions of the pencils manufactured by means of said device, the press according to the invention makes it possible during service to supervise exactly the values of the feed pressures and to regulate these pressures by modification of the supply of the feed devices 39, 40 and by adjusting the box-nut 41 of the extrusion nozzle.

What I claim is:

A device for the manufacture of pencils from two pasty compositions intended to form the lead and the sheath respectively, comprising a first die for the extrusion of the lead, said die being substantially in the form of an elongated block having, in the direction of the extrusion, an axial elongated extension of progressively decreasing cross-section, an axial bore in said block and extension and a series of longitudinally arranged bores uniformly distributed in the block, around the axial bore thereof, all of said longitudinal bores opening substantially in a same cross-section of said extension, a second die having a conical bore tapered toward the direction of the extrusion and merging into an axial bore, the said second die being axially engaged over the extension of the first die so as the free end of said extension be substantially situated in front of the tapered end of the conical bore, a worm press having a cylindrical core, an axial bore in said core, a cylindrical body rotatably mounted thereon, two oppositely threaded feed worms on the outer surface of the cylindrical body and serving respectively for the supply of compositions intended to form the lead and the sheath, one of said worms supplying the corresponding composition directly into the extrusion die, while the other supplies the corresponding composition through the axial bore in the core.

References Cited in the file of this patent

UNITED STATES PATENTS

| | | |
|---|---|---|
| 429,255 | Bishop | June 3, 1890 |
| 936,722 | Howard | Oct. 12, 1909 |
| 1,937,104 | Thomsen | Nov. 28, 1933 |
| 1,978,163 | Megow | Oct. 23, 1934 |
| 2,581,769 | Olson | Jan. 8, 1952 |

FOREIGN PATENTS

| | | |
|---|---|---|
| 893,933 | France | Mar. 6, 1944 |
| 624,699 | Great Britain | June 15, 1949 |
| 915,933 | Germany | Aug. 2, 1954 |